Patented Dec. 9, 1941

2,265,916

UNITED STATES PATENT OFFICE 2,265,916

MANUFACTURE OF SHAPED STRUCTURES AND OTHER USEFUL ARTICLES FROM CELLULOSE DERIVATIVES

Leon Lilienfeld, Vienna, Austria; Antonie Lilienfeld, administratrix of said Leon Lilienfeld, deceased, assignor to Lilienfeld Patents Inc., Boston, Mass., a corporation of Massachusetts No Drawing. Application May 11, 1936, Serial No. 79,199. In Great Britain May 15, 1935

3 Claims. (Cl. 18—54)

Cellulose ethers which are soluble in caustic alkali solution, but insoluble or only scarcely soluble in water and processes for making same and processes for converting them into shaped structures and other useful articles are described for the first time in my U. S. Patents Nos. 1,589,606, 1,589,607, 1,683,831 and 1,683,682 and in my British Patent 374,964 (these specifications are concerned with the alkali-soluble alkyl derivatives of cellulose), further in my U. S. Patents Nos. 1,722,927 and 1,722,928 (these specifications relate to the alkali-soluble hydroxy-alkyl derivatives of cellulose), further in my U. S. Patents Nos. 1,682,292, 1,682,293 and 1,682,294 (these specifications deal with the alkali-soluble hydroxy-acid ethers of cellulose), and in my U. S. Patent 2,095,524 (this deals with the alkali-soluble cellulose derivatives in which groups derived from halogen olefines are introduced into the cellulose molecule).

Various improvements relating to the manufacture of alkali-soluble cellulose ethers and of artificial structures and other useful articles made therefrom are described in my British Patents 459,422-3-4 and 462,283, 462,456 (and cognated cases) and 462,712-3.

According to the working formulae used for their preparation, inter alia according to the degree of maturing given the alkali cellulose and/or the time of the reaction and/or the time allowed the reaction mass to stand before the reaction mass is worked up and/or to the temperature at which the reaction is conducted and/or to the proportions of the alkylating or hydroxy-alkylating agents or halogen-fatty acids used for the reaction, in my aforementioned processes cellulose derivatives form which either (a) completely dissolve directly in caustic alkali solution at room temperature, or (b) only incompletely dissolve therein, or (c) do not dissolve, or do not to any useful extent, dissolve directly in caustic alkali solution at room temperature.

Among the members of Group b the proportion of the part which will dissolve in caustic alkali solution at room temperature to the part which will not dissolve in caustic alkali solution at room temperature varies in my aforementioned processes within very wide limits, for instance between 40-90 per cent. of the part that will dissolve to 60-10 per cent. of the part that will not dissolve, (see for example the relative examples of my U. S. Patents Nos. 1,683,831 and 1,683,682) and in many instances even between 10-20 per cent. of the part that will dissolve to 90-80 per cent. of the part that will not dissolve.

The members of Group b may therefore, by soaking them in caustic alkali solution at room temperature and filtration, straining, centrifuging or the like, be separated into their constituents which will dissolve in caustic alkali solution at room temperature and their constituents which will not dissolve in caustic alkali solution at room temperature, or they may be made to completely or almost completely dissolve in caustic alkali solution according to the process laid down in my British Specification No. 212,864, i. e. by contacting them with caustic alkali solution and cooling the thus obtained mixture to a temperature between plus 5° C. and minus 10° C. or lower and thereafter bringing the solution back to room temperature. (See for instance page 3, lines 62 to 71 of my British specification No. 212,864, where the making of solutions of alkali-soluble cellulose ethers by refrigeration is described for the first time).

In many cases, the process of my British specification No. 212,864 can be also used for dissolving the members of Group c in caustic alkali solution.

Since the specifications set out in the first paragraph were published, some methods for the preparation of alkali-soluble cellulose ethers have been disclosed which, however, are based on the inventive principles underlying the specifications set out in the first paragraph and which, therefore, may be regarded as further examples of carrying the processes laid down in the said specifications into effect.

In addition, since the specifications set forth in the first paragraph appeared in print, also some alkali-soluble cellulose esters of organic acids (such as cellulose mono-esters of dicarboxylic acids, for example alkali-soluble monoester of phthalic acid or succinic acid or adipic acid or maleic acid or the like or an alkali-soluble cellulose acetate diglycollate or cellulose acetate propionate diglycollate or cellulose acetate thiodiglycollate or cellulose acetate thiodilactate or alkali-soluble esters of cellulose ethers, for example alkali-soluble ethyl cellulose phthalate or alkali-soluble ethyl cellulose diglycollate or the like) and some alkali-soluble cellulose esters of inorganic acids (for instance, alkali-soluble cellulose nitrate) and processes for making same have been described.

The working up of such ethers or esters of cellulose as are at least partially soluble in caustic alkali solution and which are insoluble or only scarcely soluble in water into shaped structures has been hitherto accomplished by giving the alkaline solutions of the said cellulose derivatives the desired shape and coagulating the shaped solutions with a solution of an acid or of an acid salt or with a solution of an acid containing an acid salt and/or neutral salt.

The present invention resides in the discovery that shaped structures or other useful articles having unusually valuable properties are obtained when a shaped solution containing one or more simple or mixed cellulose ethers and/or cellulose esters which are at least partially soluble in caustic alkali solution and which are insoluble or only scarcely soluble in water are contacted with a medium which contains at least one alkali carbonate.

This discovery is the more surprising, since it could not have been foreseen that solutions of alkali soluble cellulose derivatives in caustic alkali solution are capable of being coagulated by means of solutions of salts having alkaline reaction. Least of all, however, could it be expected that the coagulation would occur with a rapidity and completeness sufficient for the production of shaped structures.

Heretofore, such coagulating agents have been generally used for the coagulation of shaped solutions of alkali-soluble cellulose derivatives as are able to neutralise the alkali present in the solutions, i. e. acids, solutions of strongly acid salts, ammonium salts of strong acids, etc.

The technical advance marked by the invention consists on the one hand in the uncommonly valuable properties of the shaped structures produced thereby. Thus, in some cases, the dynamometric properties, i. e. tensile strength, particularly in the wet state and/or extensibility of the shaped structures, such as film or artificial threads or other useful articles produced according to the present invention from alkali-soluble cellulose ethers and/or esters are superior to the dynamometric properties of the same type of shaped structures prepared from the same cellulose ethers and/or esters by means of the coagulating agents used hitherto in the art of alkali-soluble cellulose ethers or esters.

It must be further pointed out that in some cases the feel of the shaped structures, for example threads or film produced according to the present invention is definitely superior to the feel of shaped structures made from alkali-soluble cellulose ethers by means of acid coagulating media.

*Alkali recovery.*—A particularly important economical advantage of the invention over the processes in which acid coagulating agents are used for the making of shaped structures from alkali-soluble cellulose ethers and/or esters consists in the fact that, contrary to these processes, the present process admits of a recovery of at least part of the caustic alkali contained in the solutions of the cellulose ethers and/or esters and, thus, of re-introducing the caustic alkali into the process in a cyclic course. This advantage is not to be undervalued, considering that the proportions of caustic alkali present in the solutions of alkali-soluble cellulose ethers and/or esters are rather large and considering that, in the coagulating processes known hitherto in which mainly dilute sulphuric acid free from, or containing sodium sulphate and/or another sulphate, is used as coagulating bath, the caustic soda contained in the cellulose ether or cellulose ester solutions is converted into the more or less worthless sodium sulphate and is therefore simply lost.

From this it can be seen that not only the solvent, i. e. the caustic alkali, but also the coagulating agent, i. e. the sulphuric acid is completely lost in the processes known hitherto.

Consequently, a further merit of the present invention over the processes known hitherto is the possibility of re-utilising in the process at least part of the alkali carbonate contained in the coagulating medium. Since, in all cases in which a solution of one or more alkali carbonates without any further additional substances is used as coagulating medium, even after having been used for a shorter or longer time, apart from water, the coagulating medium contains practically only one or more alkali carbonates and some caustic alkali, the alkali carbonate or carbonates may be either separated from the caustic alkali in the usual manner, for example, by crystallization or by evaporating the water, heating the residue to the melting point of the caustic alkali or to a temperature between the melting point of the caustic alkali and the melting point of the alkali carbonate and thereafter separating the molten caustic alkali from the alkali carbonate. Or, the alkali carbonate may be converted into the corresponding caustic alkali by caustification, i. e. by treating the coagulating bath with lime in the manner known in the caustic alkali industry.

In either case the alkali carbonate is re-utilised in the process in a circuitous course: in the former as alkali carbonate for the preparation of the coagulating bath, in the latter as caustic soda for the production of the cellulose ether and/or for making the solutions of the cellulose ethers or esters.

If desired, accumulation, i. e. presence of a large proportion of caustic alkali or presence of any caustic alkali in the coagulating bath may be avoided, for exmple, by either continuously or from time to time introducing into the coagulating bath carbon dioxide and thus, according to the introduced quantity of $CO_2$, converting the caustic alkali present in the bath or part of it into sodium carbonate or sodium bicarbonate. Thus, in some cases, the unfavourable influence that the presence of caustic alkali in the coagulating bath may have on the freshly coagulated shaped structure or on the coagulating power of the alkali carbonate solution or on the strength and thus on the conductibility of the freshly coagulated material through the spinning or film casting machine or part of it can be checked.

If the $CO_2$ is prepared by heating of calcium carbonate and if the recovery of the caustic soda by caustification of the sodium carbonate is contemplated, the remaining calcium oxide can be used for the caustification.

A further favourable feature of the present invention is the low cost of the alkali carbonates, particularly the sodium carbonates which are among the cheapest chemicals known.

In the light of the foregoing comments it is evident that one object of the invention is to improve the properties of the shaped structures and other useful articles producible from those cellulose ethers or cellulose esters which are soluble or at least partially soluble in caustic alkali solution and which are insoluble or scarcely soluble in water.

Another object of the invention is to recover at least a substantial part of the caustic alkali contained in the solutions of the alkali-soluble cellulose ethers or esters used in the manufacture of shaped structures or other useful articles.

Another object of the invention is to re-utilise the coagulating agent in the process of making shaped structures from alkali-soluble cellulose ethers and/or esters.

Other objects of the invention will become apparent from the following description.

Although, at bottom, the carrying out of the invention in practice is comparatively simple, the working conditions may be varied within wide limits. It is therefore not intended to limit the invention to the following description and the examples of the practical execution of the process, i. e., to the particulars given therein as to the types of the alkali-soluble cellulose ethers and/or esters (i. e. as to the nature of the radical or radicals introduced into the cellulose molecule and as to the representatives set forth by way of examples for the various types of cellulose ethers and/or cellulose esters and as to the processes or methods for the production of the cellulose ethers and/or esters), as to the processes or methods and temperatures of the preparation of the cellulose ether—and/or cellulose ester solutions, as to the quantitative composition of the cellulose ether—and/or cellulose ester solutions, as to the substances which optionally may be added to the cellulose ether—or cellulose ester solutions, as to the methods of shaping the cellulose ether—and/or cellulose ester solutions, as to the manner in which these solutions are contacted with the solutions of alkali carbonates, as to the substances which optionally may be added to the cellulose ether—and/or cellulose ester solutions and/or to the alkali carbonate solutions, as to the temperature of the alkali carbonate solutions, as to the after-treatment of the coagulated shaped structures or other useful articles, etc., etc.

The practical carrying out of the invention comprises dissolving in caustic alkali solution at least one simple or mixed cellulose ether or a cellulose ester which ether or ester is at least partially soluble in caustic alkali solution and which ether or ester is insoluble or only scarcely soluble in water, bringing the solution into the shape or form of a shaped structure and acting upon the shaped solution with a medium containing, as the principal and essential coagulating agent, at least one alkali carbonate. Thereupon, optionally after having been treated with a solution of an acid or of a neutral or acid salt or of an acid and a neutral or acid salt or after having been further treated with a solution of an alkaline salt, for example an alkali carbonate or an alkaline alkali borate or an alkaline alkali silicate or phosphate or acetate or sulphide or the like, the coagulated shaped structure is washed and, optionally after being treated with an acid medium or any other medium set forth above and re-washed, dried.

As far as supportless shaped structures, such as artificial threads, artificial hair, artificial straw, film, band, strips or the like are concerned, the shaping and coagulating may be effected by extruding the cellulose ether or cellulose ester solutions through suitably shaped openings of proper size, into a bath containing at least one alkali carbonate. Supportless shaped structures, such as film or strips or the like may be also produced according to the invention by spreading the cellulose ether solution on a smooth surface which is at least partly immersed in the coagulating bath and thereafter removing the coagulated shaped structure from the said surface and finishing the shaped structure as indicated in the foregoing paragraph. In case of such shaped structures as are combined with a rigid or pliable support, such as coatings, layers and impregnations of any kind, dressings of fabrics, textile printing, book-cloth, tracing cloth, sizing of yarn, paper-sizing, paper-like surfacing etc. the shaping and coagulating may be accomplished by wholly or partially coating, impregnating, printing or otherwise covering or imbueing a rigid or pliable support with the cellulose ether—or ester solution, and, with or without intermediate drying, treating the material with a medium containing at least one alkali carbonate, by either introducing the material into a bath containing at least one alkali carbonate or by spraying a medium containing at least one alkali carbonate on the material or conducting the material through a mist containing at least one alkali carbonate or by any other method of applying a liquid or paste to a rigid or pliable support.

It is to be understood that in the present invention alkali-soluble cellulose ethers may be used which are made by any process or method whatever, for instance according to any one of the processes and/or methods described in my Patents Nos. 1,589,606, 1,683,831, 1,683,682, 1,722,927, 1,682,292 and 1,682,294 or according to any one of the processes or methods described in my British Patents 374,964, 459,122–3–4, 462,283, 462,456, and 462,712 and –3 or according to any other process or method suitable for the preparation of such cellulose ethers as are completely or almost completely soluble in caustic alkali solution at room temperature and at a lower temperature, for example at a temperature between room temperature and 0° C. or lower, or such cellulose ethers as will not directly dissolve completely or substantially completely in caustic alkali solution at room temperature, but as can be brought indirectly into solution in caustic alkali solution at room temperature by cooling their suspensions or incomplete solutions in caustic alkali solution to a temperature between room temperature and 0° C. or to 0° C. or to a temperature below 0° C., for example to minus 5° C. or to minus 10° C. or lower and then allowing the temperature to rise to 0° C. or above 0 C., for example to room temperature, or such cellulose ethers as do not wholly or substantially wholly dissolve directly in caustic alkali solution at room temperature or at a temperature between room temperature and 0° C. or even at 0° C., but as can be brought wholly or partially into solution therein at room temperature and/or at a temperature between room temperature and 0° C. or at 0° C. by cooling their suspensions or incomplete solutions to a temperature below 0° C., for example to minus 5° C. or minus 10° C. or lower and then allowing the temperature to rise to 0° C. or above 0° C., for example to room temperature.

In other words: In the present invention not only such alkali-soluble cellulose ethers as can be prepared by the processes and methods described in the specifications set forth in the foregoing paragraph, but also such alkali-soluble cellulose ethers may be used as are prepared by any other process or method suitable for the preparation of cellulose ethers which are at least partially soluble in caustic alkali solution or can be dissolved therein by application of low temperatures, for example by the process described in my British Specification No. 212,864.

It is further to be understood that, in the present invention either simple or mixed alkali-soluble cellulose ethers can be employed. As mixed ethers the following may be named by way of example:

*Mixed ethers.*—Cellulose derivatives containing in their molecule two different alkyl groups, cellulose derivatives containing in their molecule two different hydroxy-alkyl groups, cellulose derivatives containing in their molecule an alkyl group and a hydroxy-alkyl group, cellulose derivatives containing in their molecule two different hydroxy-acid residues, cellulose derivatives containing in their molecule an alkyl group and a hydroxy-acid residue, cellulose derivatives containing in their molecule a hydroxy-alkyl group and a hydroxy-acid residue and so on.

Any suitable softening agents, such as glycerine or a glycol or a sugar, such as glucose or a soap or Turkey-red oil, or a drying or non-drying oil, or a halogen derivative of a di- or a polyvalent alcohol, particularly a halohydrin, such as a dichlorohydrin or a monochlorohydrin or ethylene chlorohydrin, in short, in so far as it is compatible with the alkali-soluble cellulose ethers, any substance known in the viscose art as addition to viscose may be added to the solutions of the alkali-soluble cellulose ethers prior to their conversion into shaped structures according to the present invention.

It is further to be understood that in the present invention not only solutions of the normal alkali carbonates, but also solutions of the alkali carbonate and also solutions of both of these may be used as coagulating media.

Carbonates of all alkali metals may be used in the present invention.

The proportions of the alkali carbonates contained in the coagulating baths may be varied within wide limits, for example from 5 to 36 per cent. of normal alkali carbonate, calculated as $Na_2CO_3$ or from 3 to 14 per cent. of bicarbonate, calculated as $NaHCO_3$.

The temperature of the coagulating baths may be varied within wide limits, for example from 5° C. up to the boiling point. Thus the coagulating bath may be used at room temperature or below room temperature, for example at 8 to 10° C. or above room temperature, for instance at 30 to 45° C. or at 60° C. or at 90° C.

To the alkali carbonate solutions other salts having alkaline reaction may be added, for example a dibasic or tribasic alkali phosphate or an alkali borate, for example borax or an alkali silicate or an alkali thiosulphate or an alkali salt of a weak organic acid, such as an alkali salt of a fatty acid, for instance an alkali acetate or the like.

Also one or more neutral salts may be incorporated with the alkali carbonate solutions, such as an alkali sulphate (for example sodium sulphate) or an alkali chloride (for example sodium chloride) or the like.

As far as it is compatible with alkali carbonates any organic substance known in the viscose art as addition to coagulating baths, may, in the present invention, be added to the coagulating media containing one or more alkali carbonates, for example glycerine or a sugar, such as glucose, or Turkey-red oil or the like.

On leaving the coagulating bath containing one or more alkali carbonates the freshly coagulated shaped structure may be directly washed with water and then dried or it may be washed with water and then treated with, for instance conducted through, a bath containing an acid, or a neutral or an acid or an alkaline salt, or an acid and a neutral and/or and acid salt or any coagulating or precipitating bath known from the viscose art or from the art of making shaped structures from other alkali-soluble cellulose derivatives and then washed and dried. Or, on leaving the coagulating bath, containing one or more alkali carbonates, the freshly coagulated shaped structure may be, without being washed, directly introduced, for instance run through, a medium containing an acid, or a neutral or an acid or an alkaline salt, or an acid and a neutral and/or an acid salt or any coagulating or precipitating bath known from the viscose art or from the art of making shaped structures from other alkali-soluble cellulose derivatives and then washed and dried.

For example, on leaving the coagulating bath containing one or more alkali carbonates, the freshly coagulated shaped structure may, for a shorter (for example, a few seconds to a few minutes) or for a longer time (for instance, a few minutes to several hours), be treated with a cold or warm or hot solution of one or more alkali carbonates (for example a sodium carbonate solution of 10 to 30 per cent. strength), which solution may or may not contain one or more other salts of alkaline or neutral reaction, whereupon the shaped structure is washed or, optionally after being washed for a shorter or longer time, soured (i. e. treated in the cold or heat with a bath containing an acid or an acid salt or an acid and one or more neutral or acid salts) and washed. This mode of procedure is, for instance, recommendable in such cases in which the first washing water is allowed to accumulate an unduly large proportion of the caustic soda still adhering to the shaped structure leaving the coagulating baths which contain one or more alkali carbonates. In such cases the intermediate bath containing the alkali carbonate or carbonates and/or other salt or salts check the swelling or dissolving action of the caustic alkali.

Not uninteresting shaped structures are obtained according to the present invention when, on leaving the coagulating bath containing one or more alkali carbonates, the freshly coagulated shaped structures are directly introduced into an acid bath (for instance, into dilute sulphuric acid or any other acid bath known in the viscose art) and then washed. This modification of the process results in shaped structures such as threads or film or coatings or layers or impregnations of any kind which in some cases contain hollow spaces.

After being washed or washed and dried, the shaped structures produced according to the invention may be treated with any softening or lubricating agent known in the viscose art.

In order to explain the nature of the present invention, the following specific examples are set forth. As stated above, the invention is not limited to these examples; the parts are by weight:

EXAMPLE I 1,000 parts of air-dry cotton linters or woodpulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3,000 to 3,500 parts and comminuted at 10 to 20° C. for 2 to 3 hours in a Werner-Pfleiderer shredder or another suitable comminuting machine or in a Werner-Pfleiderer xanthating machine whose blades may be dentated. Thereupon 100 to 200 parts of ethylene chlorohydrin or 100 to 280 parts of glycerol-alpha monochlorohydrin or 100 to 300 parts of di-methyl sulphate or di-ethyl sulphate or monochloroacetic acid (for example in the form of a concentrated aqueous solution of sodium monochloroacetate) or 55 to 120 parts of ethylene oxide or 75 to 150 parts of propylene oxide or 90 to 180 parts of glycid, are added in one or several portions and the reaction mass is shredded for about 3 hours at 18 to 21° C.

The product of the reaction contained in the thus obtained reaction mass can be brought into solution in various ways, the more important being the following:

(a) The crude reaction mixture as such or after having been neutralised or acidified is washed with water and then pressed and, after the water content of the pressed product has been determined, directly mixed with so much caustic soda solution of appropriate strength as to yield a mixture containing about 6 to 8 per cent. of the cellulose ether and 6 to 10 per cent. of caustic soda, which mixture is continuously or temporarily stirred or kneaded or otherwise agitated until at least partial solution occurs. If necessary complete solution may be brought about by cooling the mixture to a temperature below room temperature, for example to a temperature between room temperature and 0° C. or to 0° C. or to a temperature of about minus 5 to minus 10° C., and bringing the solution back to room temperature or to any temperature between 0° C. and room temperature.

The washed and pressed product may also, optionally after having been dehydrated with alcohol and, if desired, exhausted with ether, be dried and thereafter dissolved as described above.

(b) The crude reaction mass is, without being washed or otherwise treated, mixed with such quantity of a caustic soda solution of appropriate strength as to yield a solution or suspension containing about 4 to 8 per cent. of the cellulose ether and 6 to 10 per cent. of caustic soda and brought into solution as described under (a).

After having been filtered and freed from gas bubbles, the cellulose ether solution prepared according to (a) or (b) is worked up into shaped structures, for example under the following working conditions, to which the invention is not limited.

ARTIFICIAL THREADS (1) The cellulose ether solution is extruded through spinning nozzles into one of the following coagulating baths:

(a) Sodium carbonate solution of 36 per cent. strength at 90° C., or (b) Sodium carbonate solution of 32 per cent. strength at 60° C. or 70° C. or 80° C. or 90° C., or (c) Sodium carbonate solution of 28 per cent. strength at 60° C. or 70° C. or 80° C. or 90° C., or (d) Sodium carbonate solution of 28 per cent. strength at 45 to 50° C., or (e) Sodium carbonate solution of 21 per cent. strength at 45 to 50° C. or at 60° C. or 70 to 80° C., or at 90° C., or (f) Sodium carbonate solution of 15 per cent. strength at 45 to 50° C. or at 60° C. or at 70 to 80° C. or at 90 C., or (g) Sodium carbonate solution of 10 per cent. strength at 45 to 50° C. or at 60° C. or at 70 to 80° C. or at 90° C., or (h) A bath containing 23 to 24 per cent. of sodium carbonate and 15 to 16 per cent. of sodium sulphate at 50° C., or (i) A bath containing 28 per cent. of sodium carbonate and 10 per cent. of sodium sulphate at 50 to 60° C., or at 70 to 90° C., or (k) A bath containing 26 per cent. of sodium carbonate and 10 per cent. of glucose or glycerol at 50 to 60° C. or at 70 to 90° C., or (l) A bath containing 21 per cent. of sodium carbonate and 18 per cent. of sodium sulphate at 50 to 60° C. or at 70 to 90° C., or (m) A bath containing 21 per cent of sodium carbonate and 13.5 parts of sodium sulphate at 50 to 60° C. or at 70 to 90° C., or (n) A bath containing 21 per cent. of sodium carbonate, 13.5 parts of sodium sulphate and 10 per cent. of glucose or glycerol at 50 to 60° C. or at 70 to 90° C., or (o) A bath containing 19 per cent. of sodium carbonate, 12 to 13 per cent. of sodium sulphate and 8 per cent. of glucose at 50 or 60 or 70° C., or (p) A bath containing 28 per cent. of sodium carbonate and 8 per cent. of borax $$(Na_2B_4O_7.10H_2O)$$

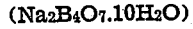

at 50 to 60° C. or at 70 to 90° C., or (r) A bath containing 20 per cent. of sodium carbonate and 23 per cent. of borax $$(Na_2B_4O_7.10H_2O)$$

at 50 to 60° C. or at 70 to 90° C., or (s) A bath containing 28 per cent. of sodium carbonate and 8 per cent. of crystallised sodium sulphite at 50 to 60° C. or at 70 to 90° C., or (t) A bath containing 20 per cent. of sodium carbonate and 17 per cent. of crystallised sodium sulphite at 50 to 60° C. or at 70 to 90° C., or (u) A bath containing 26 per cent. of sodium carbonate and 12 per cent. of sodium bicarbonate at 45 to 50° C., or (v) A bath containing 29 per cent. of sodium carbonate and 8 per cent. of sodium bicarbonate at 45 to 50° C., or (w) A bath containing 15 per cent. of sodium carbonate and 12 per cent. of sodium bicarbonate at 45 to 50° C., or (x) A bath containing 25 per cent. of sodium carbonate and 5 to 10 per cent. of caustic soda at 45 to 50° C. or at 60 to 70° C., or (y) A bath containing 19 to 21 per cent. of sodium carbonate, 12 to 13 per cent. of sodium sulphate and 5 to 10 per cent. of caustic soda at 45 to 50° C. or at 60 to 70° C., or (z) Sodium bicarbonate solution of 12 per cent. strength at 45 to 50° C., or (z1) Sodium bicarbonate solution of 12 per cent. strength at 60° C., or (z2) A bath containing 12 per cent. of sodium bicarbonate and 10 per cent. of glucose, or (z3) A bath containing 12 per cent. of sodium bicarbonate, 13 per cent. of sodium sulphate and 10 per cent. of glucose, or (z4) A bath containing 20 per cent. of sodium carbonate at 20 to 25° C., or (z5) A bath containing 27 per cent. of sodium carbonate at 25 to 30° C., or (z6) A bath containing 34 per cent. of sodium carbonate at 30 to 38° C., or (z7) A bath containing 31 per cent. of sodium carbonate at 40° C.

The solidified thread is thoroughly washed with water and dried in the usual manner.

The spinning operation may be conducted with or without additional stretch which may be effected, for example, by introducing into the path which the thread travels from the spinning nozzle to the collecting device, such as bobbin or centrifuge, one or more retarding devices, such as godets or differential rollers or glass or metal rods arranged angularly to each other or the like.

The artificial threads may be treated either in the course of their manufacture or in the finished state with a hardening agent, such as formaldehyde or the like.

As a matter of course, also such film or threads as have a reduced lustre or are entirely dull can be produced from the solution obtained according to methods (a) or (b), by the present process with the aid of any method known from the artificial silk art.

(2) The process is conducted as in the working formula 1, but with the difference that the cellulose ether solution does not directly enter the coagulating bath containing sodium carbonate, but is extruded into a solution of a neutral salt, for example one of the following baths:

(a) A solution of sodium sulphate of 25 per cent. strength having a temperature of 45 to 50° C., or (b) A solution of sodium chloride of 25 per cent. strength having a temperature of 45 to 50° C.

After this the thread is introduced into one of the baths set forth in (1) under (a) to (z7).

(3) The process is conducted according to working formula 1 or 2, but with the variation that the thread is washed on the bobbin for about 15 minutes, thereupon twisted and transformed into a skein and thereafter treated for a short time (e. g. for 1 to 20 minutes) with 2 to 10 per cent. sulphuric acid or 1 to 5 per cent hydrochloric acid or with a bath containing 2 to 10 per cent. of sulphuric acid and 10 to 16 per cent. of sodium sulphate and/or 12 to 16 per cent. of magnesium sulphate at room temperature or at 40 to 50° C. or with sulphuric acid of 30 to 70 per cent. strength at room temperature or at 5° C. or at 0° C. or at minus 5° C. or with any one of the baths set out above in (1) under (a) to (z7) and then washed and finished in the usual way. If the spinning is carried out in a centrifuge spinning machine, the first washing is performed with the cake and the separate twisting step omitted.

(4) Mode of procedure as in (3), but with the difference that, before being soured or after-treated with one of the baths set out above in (1) under (a) to (z7), the thread is washed on the bobbin or in the cake for about 2 to 5 minutes instead of 15 minutes, or not washed at all before souring.

(5) Mode of procedure as in (3) but with the difference that, before being soured or after-treated with one of the baths set out above in (1) under (a) to (z7), the thread is washed on the bobbin or in the cake for half an hour to one hour or longer (for example, for two to six hours) instead of 15 minutes.

(6) Mode of procedure as in (3) or (4) or (5), but with the exception that the first washing and the souring or after-treatment with one of the baths set out above in (1) under (a) to (z7) is performed on the bobbin or cake, whereupon the thread is washed and finished.

In case of bobbin spinning, the twisting of the thread may be effected either after the souring or after-treatment with one of the baths set out above in (1) under (a) to (z7) or after the washing following the souring or after-treatment with a bath containing one or more alkali carbonates or after drying.

(7) The process is conducted according to working formula 1 or 2, but with the variation that the thread is twisted directly from the bobbin and thereafter converted into a skein (or, if the spinning takes place in a centrifuge machine the cake is directly transformed into a skein), whereupon the skein is washed for about 15 minutes, and thereafter treated for a short time (e. g. for 1 to 20 minutes) with one of the acid media set forth under (3) or with any one of the baths set out above in (1) under (a) to (z7) and then washed and finished in the usual way.

(8) Mode of operation as in (7), but with the difference that, before being soured or after-treated with one of the baths set out above in (1) under (a) to (z7), the skein is washed for about 2 to 5 minutes instead of 15 minutes.

(9) Mode of procedure as in (7), but with the exception that, before being soured or after-treated with one of the baths set out above in (1) under (a) to (z7), the skein is washed for half an hour to one hour or longer (for example, for 2 to 6 hours).

(10) Mode of procedure as in (7), but with the difference that, upon being brought into the form of a skein, i. e. without any intermediate washing, the thread is soured or after-treated with one of the baths set out above in (1) under (a) to (z7), as described in (7) and thereafter washed and finished.

(11) Mode of operation according to working formula 1 or 2, but with the variation that (apart from the washing given the thread if the bobbin revolves in water/if it does revolve in water/or if it is washed in the centrifuge spinning machine, e. g. in the funnel thereof), the thread is, without being washed, soured or after-treated direct on the bobbin or in the cake by means of any one of the acid media set forth in (3) or of any one of the baths set out above in (1) under (a) to (z7) respectively, whereupon (in case of bobbin spinning, if desired, after being washed and/or twisted) optionally after having been transformed into a skein, it is washed (if it has not been washed or has been incompletely washed on the bobbin or in the cake) and finished.

(12) The process is conducted according to working formula 1 or 2, but with the variation that the thread collected on the bobbin or in the centrifugal box is treated with a medium containing an alkali carbonate, for example, with any one of the coagulating media set out in (1) under (a) to (z7) (for example with a 25 per cent. sodium carbonate solution at room temperature or at 45 to 50° C. with a 10 per cent. sodium carbonate solution at room temperature or at 45 to 50° C. or with a solution containing 20 per cent. of sodium carbonate and 12 to 13 per cent. of sodium sulphate at room temperature or at 45 to 50° C.) or with a solution of a neutral salt, for example a 20 to 25 per cent. solution of sodium sulphate or sodium chloride at room temperature or at 40 to 50° C. or higher. This treatment with the medium containing an alkali carbonate or with a solution of a salt can be carried out during the deposition of the thread upon the bobbin or in the centrifugal box, for example by allowing the bobbin to rotate in the liquid containing a sodium carbonate and/or another salt or by introducing such liquid into the centrifugal box during spinning, and/or after the spinning by treating the thread on the bobbin or in the cake with one of the aforesaid liquids, at room temperature or at 45 to 50° C., say, for 15 to 30 minutes or longer, for example 1 to 6 hours, then (in case of bobbin spinning after twisting the thread) converting the thread into a skein, souring the skein by any one of the acid media set forth in (3) and washing and finishing the skein.

(13) Mode of procedure as in (12), but with the difference that, after having been treated with the solution containing an alkali carbonate and/or another salt and made up into a skein, the thread is, without being soured, washed and finished.

(14) Mode of procedure as in (13), but with the difference that, after having been treated with the solution containing an alkali carbonate and/or another salt, the thread is, without being converted into a skein and without being soured, completely washed and then converted into a skein and finished.

(15) Mode of procedure as in (12), but with the difference that, after having been treated with the solution containing an alkali carbonate and/or another salt, the thread is not made up into a skein, but soured directly on the bobbin or in cake form and either washed on the bobbin or in cake form and finished or (in case of bobbin, twisted), made up into a skein, washed and finished.

(16) Mode of procedure as in (12), but with the difference that, after having been made up into a skein, the thread is washed for 2 to 3 minutes and then soured.

(17) Mode of operation as in (16), but with the exception that, before being soured, the thread is washed for about 15 minutes instead of 2 to 3 minutes.

Examples for the manufacture of staple fibre follow automatically from the foregoing examples.

If desired, the extensibility of the artificial threads may be increased by treating them with shrinking agents, for instance according to any one of the processes described in my U. S. patents Nos. 1,989,098, 1,989,099, 1,989,100, 1,989,101 and 2,001,621.

FILM (1) The cellulose ether solution is in a known manner evenly spread on the surface of the drum of a film making machine based on the drum principle, part of the drum being immersed in any one of the baths set forth in the chapter "artificial threads" in (1) under (a) to (z7) or, when the two bath system is adopted, the drum is immersed in any one of the baths set forth in the said chapter in (2) under (a) to (g), and then the freshly coagulated film is introduced into one of the baths set out in the chapter "Artificial threads" in (1) under (a) to (z7). The diameter of the drum must be so adjusted that, when the drum rotates at the desired speed, the film is sufficiently solidified at the time of its having to quit the surface of the drum in order to undergo the contemplated after-treatment or treatments.

The solidified film is in a known manner washed with hot or warm or cold water and then dried.

The casting into film and/or drying of the film may be conducted without additional stretch or with more or less additional stretch.

The film may be treated before or after drying with an aqueous solution of glycerol (for instance of 4 to 10 per cent. strength) or glycol in order to increase its flexibility.

As a matter of course, the film may also be treated with any one of the known moisture-proofing or water-proofing agents or compositions.

The film may be treated either in the course of its manufacture or in the finished state with a hardening agent, such as formaldehyde or the like.

(2) The process is conducted as in (1), but with the difference that, instead of being distributed on a drum, the cellulose ether solution is by means of a suitable appliance coated on an endless band having a smooth surface, which endless band is immersed in one of the coagulating baths set out in the chapter "Artificial threads" in (1) under (a) to (z7) or, in the event of the two baths system's being adopted, the endless band is immersed in any one of the baths set forth in the chapter "Artificial threads" in (2) under (a) to (g), wherefrom the freshly coagulated film is introduced into one of the baths set out in the said chapter in (1) under (a) to (z7).

(3) The process is conducted as in (1) or (2), but with the difference that, instead of being spread on the surface of a drum or of an endless band which is at least partly immersed in the coagulating bath, the cellulose ether solution is extruded through a suitable hopper or slit into any one of the baths set forth in the chapter "Artificial threads" in (1) under (a) to (z7) or, in the event of the two bath system's being adopted, the cellulose ether solution is extruded into any one of the baths set forth in the chapter "Artificial threads" in (2) under (a) to (g), wherefrom the freshly coagulated film is introduced into one of the baths set out in the said chapter in (1) under (a) to (z7).

(4) The process is conducted as in (1) or (2) or (3), but with the difference that, on leaving the coagulating bath or, when the two bath method is followed, the second bath, the film is further treated at room temperature or at a raised temperature in a consecutive bath with a separate portion of the same bath containing one or more alkali carbonates in which it has been coagulated or with any other bath containing at least one alkali carbonate, for example one of the other baths set out in (1) under (a) to (z7), whereupon the thus treated film is either simply washed and finished, or washed, soured, washed again and finished.

(5) The process is conducted as in (1) or (2) or (3), but with the exception that, on leaving the coagulating bath or, when the two bath method is followed, the second bath, the film is washed for 2 to 15 minutes and thereafter treated for a short time (e. g. for 1 to 20 minutes) with a bath containing 2 to 10 per cent. of $H_2SO_4$ and 10 to 16 per cent. of $Na_2SO_4$ and/or 12 to 16 per cent. of $MgSO_4$ at room temperature or at 40 to 50° C. or with sulphuric acid of 30 to 70 per cent. strength at room temperature or at 5° C. or at 0° C. or at minus 5° C. and then washed and finished in the usual manner.

(6) Mode of procedure as in (5), but with the difference that no intermediate washing takes place between the coagulation and the after-treatment with an acid medium.

(7) The process is conducted as in (4), but with the exception that, instead of with a bath containing one or more alkali carbonates, the film leaving the coagulating bath is, with or without intermediate washing, treated with a solution of a neutral salt, for example with a 20 to 25 per cent. solution of sodium sulphate or sodium chloride at room temperature or at 40 to 50° C. or at a higher temperature.

As a matter of course, also such threads or film as have a reduced lustre or are entirely dull can be produced by the present process with the aid of any method known from the artificial silk art.

Threads or film within which hollow spaces are distributed can be obtained, for example, by incorporating with the cellulose ether solution sodium carbonate or another substance capable of developing a gas during the spinning and introducing the freshly coagulated threads or film from the coagulating bath directly into an acid bath, for example one of the acid baths set forth in the chapter "Artificial threads" (under (3)) or in the chapter "Film" (under (5)) or by dispersing air or another gas in the cellulose ether solution and coagulating the shaped cellulose ether solution by any one of the methods set forth in the chapter "Artificial threads" under (1) to (17).

FINISHING (DRESSING) AND PRINTING OF TEXTILES

Finishing (1) A woven fabric, such as a cotton fabric is provided by means of a suitable machine, for example a backfilling machine or a padding machine or a spreading machine, with one or more coatings of the cellulose ether solution, to which a filling material such as talc or china clay or zinc white or a dye-stuff or pigment, such a lake or lampblack or ochre or mica and/or a softening agent, for instance an oxytrimethylene-sulphide (see my U. S. Patent No. 1,018,379) or a soap or Turkey-red oil or a drying or non-drying oil etc. may be added. The coated or impregnated or filled material is then introduced directly or after intermediate drying and/or steaming, into one of the coagulating baths or combinations of coagulating baths set forth in the chapter "Artificial threads" in (1) under (a) to (z7) and in (2) under (a) to (g) and is then washed and dried.

Consequently, it may be safely refrained from repeating here all said particulars.

The textile material may be treated before or after drying with a softening agent, such as a soap or Turkey-red oil or glycerol or the like.

(2) The procedure is as in (1), but with the exception that the cellulose ether solution is mixed with a solution of starch or dextrin or any other colloid known in the finishing art.

(3) The process is conducted as in (1) or (2), but with the exception that measures are taken towards incorporating with the cellulose ether deposited in or on the fibres of the fabric gas bubbles or hollow spaces. This may be done in any known manner either by dispersing or otherwise distributing a gas, such as air or hydrogen or nitrogen or the like, in the cellulose ether solution or by incorporating with the cellulose ether solution sodium carbonate or another substance capable of liberating a gas on being contacted with an acid medium, and/or by introducing the impregnated cloth from the coagulating bath directly into an acid bath, for example sulphuric acid of 2 to 15 per cent. strength at 4 to 8° C. or at room temperature or at 35 to 45° C., or into a bath containing 10 to 16 per cent. of $H_2SO_4$ and 20 to 25 per cent. of $Na_2SO_4$ or a bath containing 10 to 15 per cent. of $Na_2SO_4$, 14 to 18 per cent. of $MgSO_4$ and 6 to 16 per cent. of $H_2SO_4$ at room temperature or at 35 to 45° C.

(4) The process is conducted as in any one of the examples (1) to (3), but with the difference that, before being applied to the fabric, the cellulose ether solution is converted into a lather according to the process described in my U. S. application Ser. No. 618,804.

Examples for sizing yarn follow automatically from (1) to (4).

(5) The cellulose ether solution is mixed with a dye-stuff or with a pigment, such as a lake or ochre or lampblack or zinc white or finely divided mica or a bronze powder free from aluminium and then printed in a rouleaux printing machine or stencilled on a cotton fabric. After being printed, the cotton fabric is, if desired after being dried, introduced into one of the coagulating baths or combinations of baths set out in the chapter "Artificial threads" in (1) under (a) to (z7) and in (2) under (a) to (g).

What in the chapters "Artificial threads" and "Film" has been said about the application to the making of threads and film, of all variations regarding the coagulating baths, their temperature and all details of after-treatment holds good with the finishing or dressing or printing of textiles also. In other words: paying due heed to the difference between manipulation and technique of the manufacture of artificial threads or film on the one hand and of the dressing or finishing or filling or printing or sizing of textiles on the other, it will be an easy and, with regard to every particular, self-evident task for every expert skilled in the art to apply all variations of the present process set forth in the chapter "Artificial threads" sub (1) to (17) to the finishing, coating, dressing or filling or sizing or printing of textiles.

Cements and adhesives

The cellulose ether solution is used for the pasting together of two or more sheets of paper or cardboards or cotton fabrics or veneer, the materials pasted together being then, if desired after intermediate drying, introduced into one of the coagulating baths or combinations of baths set out in the chapter "Artificial threads" in (1) under (a) to (z7) and in (2) under (a) to (g).

Thick plates

Thick plates can be made by accordingly shaping concentrated solutions or pastes of the cellulose ether and, optionally after intermediate drying, treating them with one of the precipitating baths or combinations of baths set out in the chapter "Artificial threads" in (1) under (a) to (z7) and in (2) under (a) to (g).

All variations regarding the coagulating baths, their temperature, further the age of the cellulose ether solution and all details of after-treatment set forth in the chapter "Artificial threads" sub (1) to (17) can be applied to the practicing of the present invention for using the cellulose ether solution as an adhesive or for producing thick plates or the like according to the invention. As a matter of course, the manipulation and techniques must be adapted to the mechanical and other methods and ways prevailing in these arts.

In the production of shaped structures or other useful articles according to the present process, which production is illustrated by this and the other examples, the coagulating bath or baths may be kept in permanent circulation in the usual manner.

In any and all items of this example the coagulating bath or baths may be kept in permanent circulation in the usual manner and the sodium carbonate and caustic soda may be recovered in the form of sodium carbonate or caustic soda (caustification of the sodium carbonate) as described under the heading "Alkali recovery" above given.

The caustic soda getting into the bath from the shaped structures may be wholly or partly converted into a sodium carbonate by continuously or temporarily introducing $CO_2$ into the bath.

EXAMPLE II

The process is conducted as in Example I, but with the difference that, instead of the amounts of etherifying agents set forth therein, 200 to 400 parts of ethylene chlorohydrin or 150 to 600 parts of glycerol alpha-monochlorohydrin or 300 to 500 parts of di-methyl sulphate or di-ethyl sulphate or monochloroacetic acid (for example in the form of a concentrated aqueous solution of monochloroacetate) or 120 to 240 parts of ethylene oxide or 150 to 300 parts of propylene oxide or 180 to 360 parts of glycid are used for the preparation of the cellulose ether.

EXAMPLE III

The process is conducted as in Example I, but with the exception that, instead of the etherifying agents set forth therein, a mixture of 100 to 200 parts of ethylene chlorohydrin or of 100 to 200 parts of glycerol alpha-monochlorohydrin or of 55 to 120 parts of ethylene oxide or of 75 to 150 parts of propylene oxide or of 90 to 180 parts of glycid and 100 to 200 parts of di-ethyl sulphate or di-methyl sulphate or a mixture of 100 to 200 parts of di-methyl sulphate and 100 to 200 parts of di-ethyl sulphate, or a mixture of 100 to 200 parts of ethylene chlorohydrin or of 100 to 200 parts of monochlorohydrin or of 100 to 200 parts of di-methyl sulphate or di-ethyl sulphate or of 55 to 120 parts of ethylene oxide or of 75 to 150 parts of propylene oxide or of 90 to 180 parts of glycid and 100 to 300 parts of monochloroacetic acid (for example in the form of sodium monochloroacetate) is used in the preparation of the cellulose ether.

EXAMPLE IV

The process is conducted as in Example I, but with the difference that, instead of the etherifying agents there given, a mixture of 50 parts of ethylene chlorohydrin or of 70 parts of monochlorohydrin or of 30 to 40 parts of ethylene oxide or of 70 to 80 parts of propylene oxide or of 80 to 120 parts of glycid and 100 to 200 parts of di-ethyl sulphate or di-methyl sulphate or 100 to 300 parts of monochloroacetic acid (for example in the form of sodium monochloroacetate), or a mixture of 50 to 100 parts of di-methyl sulphate and 100 to 200 parts of di-ethyl sulphate or 100 to 300 parts of monochloroacetic acid (for example in the form of sodium monochloroacetate), or a mixture of 50 to 100 parts of di-ethyl sulphate or of di-methyl sulphate and 100 to 300 parts of monochloroacetic acid (for example in the form of sodium monochloroacetate) is used in the preparation of the cellulose ether.

EXAMPLE V

The process is conducted as in Example I, but with the exception that, instead of the etherifying agents there given, a mixture of 25 to 50 parts of ethylene chlorohydrin or of 30 to 60 parts of monochlorohydrin or of 20 to 30 parts of ethylene oxide and 50 parts of di-ethyl sulphate or di-methyl sulphate or 50 parts of monochloroacetic acid (for example in the form of sodium monochloroacetic), or a mixture of 25 to 50 parts of di-methyl sulphate and 50 parts of di-ethyl sulphate or monochloroacetic acid (for example in the form of sodium monochloroacetate) or a mixture of 25 to 50 parts of di-ethyl sulphate or di-methyl sulphate and 50 parts of monochloroacetic acid (for example in the form of sodium monochloroacetate) is used in the preparation of the cellulose ether

EXAMPLE VI

The process is carried out as in any one of the Examples I to V, but with the exception that the etherifying operation is conducted at 5 to 10° C.

EXAMPLE VII

The process is conducted as in any one of the Examples I to VI, but with the difference that the alkali cellulose used in the preparation of the cellulose ether is allowed to mature for 12 to 96 hours at 15 to 25° C. With increased time of maturing the solubility of the cellulose ether in caustic alkali solution at room temperature improves in many cases in which unmatured alkali cellulose or alkali cellulose that has been matured for a short time yields a product that is incompletely soluble or insoluble at room temperature.

EXAMPLE VIII

The process is conducted as in any one of the Examples I to VII, but with the exception that in the preparation of the cellulose ether after the 3 hours' stirring, kneading or shredding provided for in I, the reaction mass is allowed to stand at 15 to 25° C. for 20 to 96 hours. With extended time of reaction the solubility of the cellulose ether in caustic alkali solution at room temperature improves in many cases in which a short time of reaction yields a product that is incompletely soluble or insoluble at room temperature.

EXAMPLE IX

The process is conducted as in any one of the Examples I to VIII, but with the difference that the cellulose ethers used in these examples are in the form of the crude reaction masses (when necessary with addition of some concentrated caustic alkali solution or solid caustic alkali in replacement of, or in excess over, the caustic alkali used up in the reaction) or in the isolated form, i. e. in the form of the washed and, optionally dried, reaction product or in the purified form, treated in presence of alkali with 70 to 150 parts of propyl chloride or 100 to 600 parts of benzyl chloride or with 50 to 200 parts of ethyl chloride or with 40 to 180 parts of methyl chloride at 50 to 80° C. and then used as cellulose ether according to Example I.

EXAMPLE X

The process is conducted as in any one of the Examples I to IX, but with the exception that instead of to 3,000 to 3,500, the alkali cellulose used in the preparation of the cellulose ether is pressed to 2,000 parts.

EXAMPLE XI

The process is conducted as in any one of the Examples I to IX, but with the exception that, instead of to 3,000 to 3,500, the alkali cellulose used in the preparation of the cellulose ether is pressed to 1,300 to 1,600 parts.

EXAMPLE XII A TO H

A. 1,000 parts of air-dry cotton linters or wood-pulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3,000 to 3,500 parts and comminuted at 10 to 18° C. for 2 to 3 hours in a Werner-Pfleiderer shredder or another suitable comminuting machine. Thereupon the alkali cellulose is placed in a rotating autoclave or an autoclave provided with a stirring device, 200 parts of pre-cooled ethyl chloride are added, and the material is heated to 60 to 80° C. and kept at this temperature for 12 to 24 hours.

The product of the reaction is dissolved in a similar manner as described in Example I and the solution worked up into shaped structures.

B. The process is conducted as in Example A, but with the difference that, instead of 200 parts, 300 to 1,500 parts of ethyl chloride are used in the preparation of the cellulose ether.

C. The process is conducted as in Example A, but with the exception that, instead of 200 parts, 75 to 100 parts of ethyl chloride are used in the preparation of the cellulose ether.

D. The process is conducted as in Example A, but with the exception that, instead of 200 parts of ethyl chloride, a mixture of 50 parts of ethyl chloride and 50 to 200 parts of ethylene chlorohydrin or 25 to 140 parts of ethylene oxide or 100 to 200 parts of di-methyl sulphate or 100 to 200 parts of methyl chloride or 100 to 300 parts of benzyl chloride or of monochloroacetic acid (for example in the form of sodium monochloroacetate) is used.

E. The process is carried out as in any one of the Examples A to D, but with the difference that the etherifying operation is conducted at 50° C.

F. The process is carried out as in any one of the Examples A to D, but with the difference that the etherifying operation is conducted at 95° C.

G. The process is conducted as in any one of the Examples A to F, but with the exception that in the etherifying operation the duration of the heating is only 3 to 6 hours.

H. The process is conducted as in any one of the Examples A to G, but with the difference that the alkali cellulose is allowed to mature for 12 to 96 hours or longer.

If there is no excess of ethyl chloride over the proportion calculated on the proportion of NaOH contained in the alkali cellulose, the etherifying reaction may be conducted at a temperature exceeding 100° C., for example at 110 to 130° C. or higher.

EXAMPLE XIII A TO H

The process is conducted as in any one of the Examples XII A to H, but with the difference that, instead of to 3,000 to 3,500 parts, the alkali cellulose used in the preparation of the cellulose ether is pressed to 2,000 parts.

EXAMPLE XIV A TO H

The process is conducted as in any one of the Examples XII A to H, but with the exception that, instead of to 3,000 to 3,500 parts, the alkali cellulose used in the preparation of the cellulose ether is pressed to 1,350 to 1,600 parts.

EXAMPLE XV

The process is conducted as in any one of the Examples I to XIV, but with the difference that, instead of the caustic soda solution of 18 per cent. strength, a custic soda solution of 15 per cent. strength is used for the preparation of the alkali cellulose to be etherified.

EXAMPLE XVI

The process is conducted as in any one of the Examples I to XIV, but with the difference that, instead of the caustic soda solution of 18 per cent. strength, a caustic soda solution of 12 per cent. strength is used for the preparation of the alkali cellulose to be etherified.

EXAMPLE XVII

The process is conducted as in any one of the Examples I to XIV, but with the difference that, instead of the caustic soda solution of 18 per cent. strength, a caustic soda solution of 9 per cent. strength is used for the preparation of the alkali cellulose to be etherified.

EXAMPLE XVIII

The process is conducted as in any one of the Examples I to XIV, but with the difference that, instead of the caustic soda solution of 18 per cent. strength, a caustic soda solution of 5 per cent. strength is used for the preparation of the alkali cellulose to be etherified.

EXAMPLE XIX

The process is conducted as in any one of the Examples XIV to XVIII, but with the exception that the alkali cellulose to be etherified is dried to constant weight, preferably under reduced pressure at room temperature or at 50 to 60° C.

Any one of the simple ethyl or methyl celluloses obtained in any one of the preceding examples may be hydroxyalkylated in the following manner:

The NaOH content of the crude reaction mixture resulting from the methylating or ethylating operation in any one of the Examples I, II, VI, VII, X, XI, XII A to C and E to H, and XIII to XIX is determined by analysis, whereupon, optionally after compensating for the amount of NaOH used up in the alkylating reaction by supplying to the reaction mixture the equivalent or a larger quantity of NaOH in the form of powder or of a strong solution, for instance of 30 to 50 per cent. strength, the reaction mixture is treated with 50 to 150 parts of ethylene chlorohydrin or with 70 to 210 parts of glycerol alpha-monochlorohydrin or with 25 to 75 parts of ethylene oxide or with 32 to 100 parts of propylene oxide as described in any one of the preceding relative examples for alkali cellulose.

The thus obtained methyl- or ethyl-hydroxyethyl cellulose or methyl- or ethyl-1:3-dihydroxy-propyl cellulose or propyl cellulose is worked up and used as described in Example I.

Instead of being prepared by steeping the cellulose in an excess of caustic alkali solution and removing the excess by pressing, in any one of the preceding examples the alkali cellulose may be prepared by mixing the cellulose in a suitable mixing apparatus, for example a shredder or a kneading machine or a mill or a disintegrator or an edge runner or the like with the amount of caustic soda solution corresponding with the quantity remaining in the alkali cellulose used in the relative examples after pressing. The mixing of the cellulose with the caustic alkali solution may be conducted at room temperature, or at a temperature above room temperature, for example at 24 to 3°° C., or with cooling, for example to 15° or 10° C. or lower. The time of mixing may be varied within wide limits, for example from 1 hour to 24 hours or longer.

In the coagulating baths used in the foregoing examples the primary or secondary sodium carbonate may be wholly or partially replaced by one or more alkali salts having alkaline reaction of other weak inorganic or organic acids, for example by sodium tetra borate (borax) or by dibasic or tribasic sodium phosphate or by an alkaline sodium silicate or by sodium acetate or by sodium sulphide or the like.

Instead of the cellulose ethers used in the foregoing examples cellulose esters which are at least partially soluble in caustic alkali solution and which are insoluble or only scarcely soluble in water may be used.

In the foregoing examples, any excess of the etherifying agents which has not been used up in the etherifying reaction may be recovered by condensation or distillation.

In the foregoing examples, instead of cellulose, a conversion product of cellulose—for instance, a cellulose hydrate or a hydrocellulose produced by chemical action on cellulose, such as mercerisation with subsequent washing and, if desired, drying; or by treating with a strong inorganic or organic acid or a mixture of both; or by heating with a dilute solution of a mineral acid; or by treatment with a zinc halide; or by a mechanical process, such as grinding in presence of water or the like; or an oxy-cellulose—in short any body of the cellulose group which has been proposed for the manufacture of viscose or of any other cellulose derivatives or compounds or of ammoniacal-copper-oxide cellulose.

In the foregoing examples, instead of caustic soda, another alkali hydroxide, such as caustic potash may be used.

In the foregoing examples, instead of caustic alkalies, sulphonium hydroxides (for instance trimethylsulphonium hydroxide) may be used.

In the foregoing examples, a small amount of a catalyser, for example of a metal salt, such as copper salt, nickel salt, silver salt, zinc salt, iron salt, or a peroxide, for instance benzoyl peroxide or ammonia or primary, secondary or tertiary organic bases, such as a mono- or di-alkyl aniline or a mono-, di- or tri-alkyl amine or an aralkyl amine, or an oxy-alkyl amine or the like may be added to the alkali cellulose or reaction mixture.

If feasible or expedient, in the foregoing examples, instead of the halogenated etherifying agents used therein, equivalent quantities of the corresponding brominated or iodinated reagent (for example alkyl bromides or alkyl iodides or monobromohydrin or monoiodohydrin or ethylene bromohydrin or ethylene iodohydrin or bromo-acetic acid or iodo-acetic acid, etc.) may be used.

If feasible or expedient, in the foregoing examples, instead of the alkylating or hydroxy-alkylating agents used therein, equivalent quantities of alkylating or hydroxy-alkylating agents containing other alkyl or hydroxy-alkyl groups can be used, for instance methyl chloride or propyl chloride or an amyl chloride or a butyl chloride or propylene chlorohydrin or butylene chlorohydrin.

If feasible or expedient, instead of ethylene oxide or propylene oxide, other alkylene oxides, such as butylene oxide, in short all suitable compounds which contain an ethylene oxide ring can be used in the foregoing examples.

If feasible or expedient, instead of alkyl halides or di-alkyl sulphates, equimolecular amounts of their substitution or addition derivatives, for example halogen alkyl amines, such as halogen alkyl-dialkyl amines or their hydrochlorides can be employed in the foregoing examples.

If feasible or expedient, in the foregoing relative examples, instead of the chloroacetic acid, the equimolecular quantity of an ester of chloroacetic acid, for example methyl- or ethyl-chloroacetate or a halogen derivative of a homologue of acetic acid, for instance alpha-chloropropionic acid or alpha-chloro-isobutyric acid or alpha-bromo-propionic acid or alpha-bromo-isobutyric acid or the like or an alkali salt or an ester thereof may be employed.

If desired, the extensibility of the shaped structures, such as threads or film or coatings or the like produced according to the present invention may be increased by treating them either in the course of their manufacture, for example after coagulation and washing or in the finished wet or dry state with suitable shrinking agents, for example, with some of the shrinking agents mentioned in my U. S. Patents Nos. 1,989,098, 1,989,100, 1,989,101, 2,001,621, 2,004,875 and 2,004,876.

As a guiding line with regard to the question whether or not the alkali cellulose should be allowed to mature before being brought together with the etherifying agent or agents may, among others, serve the desired viscosity of the final solution of the cellulose ethers which is to be worked up into shaped structures, and in connection therewith the viscosity of the kind of cellulose contemplated. If it is desired to give the solution a definite viscosity, then the alkali cellulose produced from the kind of cellulose contemplated is subjected to a maturing process, if without maturing this kind of cellulose yields a higher viscosity. If, however, the solution exhibits from the first the desired grade of viscosity, that is without maturing, the maturing is superfluous. Now, as the viscosities of the different kinds of cellulose on the market (linters and wood-pulp) differ very much from one another, the question of maturing depends in most cases on the one hand on the viscosity desired of the solution intended for the manufacture of shaped structures, and on the other hand on the viscosity of the kind of cellulose being worked.

The term "alkali carbonate" in the description and claims is, wherever the context permits, intended to include the primary and secondary alkali carbonates (i. e. alkali monocarbonates and alkali bicarbonates).

In the specification and claims, wherever the context permits, the expressions "alkali-soluble oxy-organo compound of cellulose," "alkali-soluble cellulose ether," "alkali-soluble celluose ester," "oxy-organo compound of cellulose which is soluble or at least partially soluble in caustic alkali solution," "cellulose ether which is soluble or at least partially soluble in caustic alkali soution," "cellulose ester which is soluble or at least partially soluble in caustic alkali solution," "oxy-organo compound of cellulose which is at least partially soluble in caustic alkali solution," "cellulose ether which is at least partially solube in caustic akali solution" and "cellulose ester which is at least partially soluble in caustic alkali solution" are intended to include such simple and mixed cellulose ethers and such cellulose esters and such cellulose ether-esters as are completely or almost completely soluble in caustic alkali solution at room temperature or at a lower temperature, for example at a temperature between room temperature and 0° C. or lower and such simple and mixed cellulose ethers and such cellulose esters and such cellulose ether-esters as do not directly dissolve (completely or incompletely) in caustic alkali solution at room temperature, but as can be made to dissolve or to completely dissolve therein by cooling their suspensions or in complete solutions in caustic alkali solution to a temperature between room temperature and 0° C. or to 0° C. or to a temperature below 0° C., for example to minus 5° C. or to minus 10° C. or lower and then allowing the temperature to rise to 0° C. or above 0° C., for example to a temperature between 0° C. and 20° C., and such simple or mixed cellulose ethers and such cellulose esters and such cellulose ether-esters as do not directly dissolve in caustic alkali solution at room temperature or at a temperature between room temperature and 0° C. or even at 0° C., but as can be brought into solution therein at room temperature and/or at a temperature between room temperature and 0° C. or at 0° C. by cooling their suspensions or incomplete solutions to a temperature below 0° C., for example to minus 5° C. or minus 10° C. or lower and then allowing the temperature to rise to 0° C. or above 0° C., for example to room temperature.

The term "cellulose" used in the description and claims is, wherever the context permits, intended to include cellulose, its conversion and oxidation products, such as cellulose hydrate, hydrocellulose, oxycellulose, acidcellulose and the like, in short, any body of the cellulose group which has been proposed as starting material for the preparation of cellulose derivatives or cellulose compounds of any kind.

Wherever the context permits, the term "alkali cellulose" means alkali cellulose prepared in the usual manner, namely by steeping cellulose in caustic alkali solution and removing the excess of the latter by pressing, or by mixing cellulose with such an amount of caustic alkali solution as is desired to be present in the final alkali cellulose.

The expression "etherification" used in the specification and claims covers alkylation or aralkylation or hydroxy-alkylation or production of hydroxy-acid derivatives, "ether" covers simple alkyl or aralkyl and hydroxy-alkyl or hydroxy-acid ethers and also mixed ethers, for example the mixed ethers set forth in the above paragraph headed "Mixed ethers," "etherifying agents" covers alkylating and aralkylating and hydroxy-alkylating agents and halogen fatty acids.

The term "hydroxy-alkyl" is intended to include the halogenated or non-halogenated radicals of di- or poly-valent alcohols in conjunction with one or more oxygens or hydroxyls.

Wherever the context permits, the terms "alkyl," "alkylate," "alkylating agent," "alkylation" are intended to include unsubstituted or substituted (for example aralkyl groups) alkyl groups, alkylate with alkylating agents that contain unsubstituted or substituted (for example aralkyl groups) alkyl groups, alkylating agents that contain unsubstituted or substituted (for example aralkyl groups) alkyl groups, alkylation with alkylating agents that contain unsubstituted or substituted (for example aralkyl groups) alkyl groups.

The term "hydroxy-alkylating agents" is intended to include halogen derivatives of di- or polyhydric alcohols, particularly halohydrins, such as monohalohydrins and alkylene oxides.

In the specification and claims the expression "halogen fatty acid" or "monohalogen fatty acid" includes, wherever the context permits, monochlor-, monobrom- and monoiodo-fatty acids themselves, their derivatives (such as esters) and their salts, as well as substances and mixtures of substances which yield monohalogen fatty acids or their derivatives or their salts.

The expression "artificial structures" or "shaped structures" used in the specification and claims is intended to include: Artificial threads, particularly artificial silk and staple fibre, artificial hair, artificial straw, film of every kind, bands and plates of every kind, plastic masses of any description; adhesives and cements, finishes, coatings and layers of every kind, particularly such as are applicable in finishing, filling and dressing of textile fabrics, sizing of yarn, thickening agents are fixing agents for pigments in textile printing and the like; paper-like surfacing, paper-sizing; in the manufacture of artificial leather or of book-cloth or of tracing cloth or of transparent paper or of transparent cloth and the like.

The term "artificial threads" denotes artificial threads and spun goods of all kinds, for instance artificial silk, artificial cotton, artificial wool, artificial hair and artificial straw of any kind.

The expression "textile material" in the specification and claims includes, wherever the context permits, any spun or woven textile fibres, whether animal or vegetable (for example, flax, linen, hemp, ramie, jute, wool, and particularly cotton, as well as artificial fibres of any kind in the form of yarn, staple fibre or fabrics consisting of, or containing artificial fibres) in the form of pure fabrics or in the form of mixed fabrics or in the form of yarn in skeins, cops or warps.

What I claim is:

1. A process of making regenerated artificial structures which comprises introducing an alkaline solution of an oxy-organo compound of cellulose, which compound is substantially insoluble in water, into a solution containing at least 3 to 5% of a dissolved alkali metal salt of carbonic acid, which latter solution is substantially free from ammonium salts of strong mineral acids.

2. A process as claimed in claim 1, wherein the solution of the cellulose derivative is shaped on a support.

3. A process of making regenerated artificial structures which comprises introducing a shaped alkaline solution of an oxy-organo compound of cellulose, which compound is substantially insoluble in water, into a solution containing at least 3 to 5% of a dissolved alkali metal salt of carbonic acid, which latter solution is substantially free from dissolved substances which if present would be capable of neutralizing caustic alkali.

LEON LILIENFELD.